INVENTOR
EDGAR L. STEED
BY
Pennie, Edmonds, Morton and Barrows
ATTORNEYS

INDEXING CONTROL MEANS

Filed Jan. 16, 1946 2 Sheets-Sheet 2

INVENTOR
EDGAR L. STEED
BY
Pennie, Edmonds, Morton and Barrows
ATTORNEYS

Patented July 10, 1951

2,560,395

UNITED STATES PATENT OFFICE 2,560,395

INDEXING CONTROL MEANS

Edgar L. Steed, Poughkeepsie, N. Y., assignor, by mesne assignments, to Recordgraph Corporation, a corporation of Delaware Application January 16, 1946, Serial No. 641,558

16 Claims. (Cl. 274—11)

This invention relates to control mechanisms adapted, among other uses, to govern the indexing of a member to a plurality of spaced positions, for example, the indexing of a stylus in sound recording and reproducing apparatus to a plurality of parallel sound tracks mechanically produced in a recording medium of strip form.

In the operation of one type of sound recording and reproducing apparatus of the above character to which the invention finds application, a stylus is caused to emboss or otherwise form a number of parallel longitudinal sound tracks in a strip of uncoated motion picture film arranged as an endless loop, the several tracks being joined by short connecting sections to form a continuous record. Since the recording capacity of a particular length of film is inversely proportional to the spacing of the sound tracks thereon, this spacing usually is made as small as is practicable. Great precision and reliability of operation are therefore required in the means for indexing the stylus in succession to the several laterally spaced sound track positions. Another important requirement is that the indexing or track-shifting means operate only at the end of a turn of the film loop and of a single complete sound track therein and not at any intermediate position of the film.

It has been proposed, heretofore, to employ with sound recording and reproducing apparatus of the above described type, indexing control means comprising a single roller or like member resiliently pressed against the edge of the film strip and displaced in the plane of the strip in a direction normal to said edge by the passage of a notch-like depression formed in the edge at a location corresponding to the desired cross-over between sound tracks. For examples of such proposed indexing control arrangements reference may be had to U. S. Patents Nos. 2,066,041 and 2,088,451.

I have found, however, that control of the indexing of a sound recording or reproducing stylus to a plurality of spaced sound tracks cannot reliably be exercised in the proposed manner by a single roller or like member because defects in the strip edge which may be present originally or which may develop in use, such as, for example, torn sprocket holes when the record medium is perforated motion picture film, also displace the roller and are likely thereby to cause operation of the track-shifting mechanism at some location in a sound track other than the end thereof, thus disrupting the proper functioning of the apparatus.

The present invention differs from prior art arrangements and overcomes the disadvantages thereof by providing, instead of a single notch-like depression in the film edge, a series of regularly formed, uniformly spaced notches, clearly distinguishable from any random defects of the edge, and by providing for cooperation with said series of notches instead of the single contacting member of prior art a pair of spaced members simultaneously in contact with the strip edge, said members being so formed and spaced relative to the form and spacing of the notches and so mounted relative to cooperating members of the indexing mechanism as to constitute, jointly with the notched strip, indexing control means which is insensitive to defects in the strip edge but which assures reliable operation of the indexing mechanism at the desired phase of the motion of the strip.

It is an important object of the present invention to provide precise and reliable indexing means for a sound recording or reproducing head mounting a stylus, to locate the stylus relative to a record medium, in succession, at a plurality of spaced sound track positions.

It is another object to provide indexing control means actuated by a movable strip or other member provided with edge or surface indentations or protrusions for control purposes, which is reliable in operation and which is relatively insensitive to defects and irregularities in the contours of the strip or member other than irregularities intentionally provided.

Another object is to provide a control mechanism which depends for its operation on the relation of the spacing of a plurality of indentations or protrusions formed in a movable member, to the spacing of a plurality of members adapted to engage said indentations or protrusions and to be actuated thereby.

A further object is to provide a control mechanism characterized in operation by a sustained unidirectional displacement of a member thereof upon the oscillatory displacement of another member thereof operatively connected to said first member.

According to the general features of the invention in its application to sound recording and reproducing apparatus of the type hereinbefore referred to, the multiple sound track record film strip preferably is provided with a plurality of uniformly spaced notches in an edge thereof at a portion closely adjacent the location of the film-loop splice, at which portion it is convenient to provide the cross-over from one sound track to another. The edge of the film is simultaneously engaged under suitable pressure by a pair of pins spaced apart in predetermined relation to the separation or spacing of the notches and supported on a mounting pivoted about a pair of axes.

Passage of the film causes the notches to actuate the pins to produce a rocking motion about one axis and a sustained unidirectional displacement about the other axis. The latter displacement serves to operate a switch or other means controlling the track-shifting mechanism. Because their travel past the pins results chiefly in a rocking motion about the first axis without sustained displacement about the second axis and also due to a time delay in the operation of the mechanism, sprocket hole tears and other non-periodic irregularities in the edge of the film or even periodic irregularities whose spacing does not bear the proper relation to the spacing of the pins, are ineffective to initiate a track-shifting cycle. Means are provided whereby once such a cycle has been initiated by the passage of the film notches, its completion is assured.

The invention will better understood by consideration of the following detailed description of preferred embodiments thereof, taken in connection with the appended drawings in which.

Figures 1, 2, 3, 4, 5, 10:
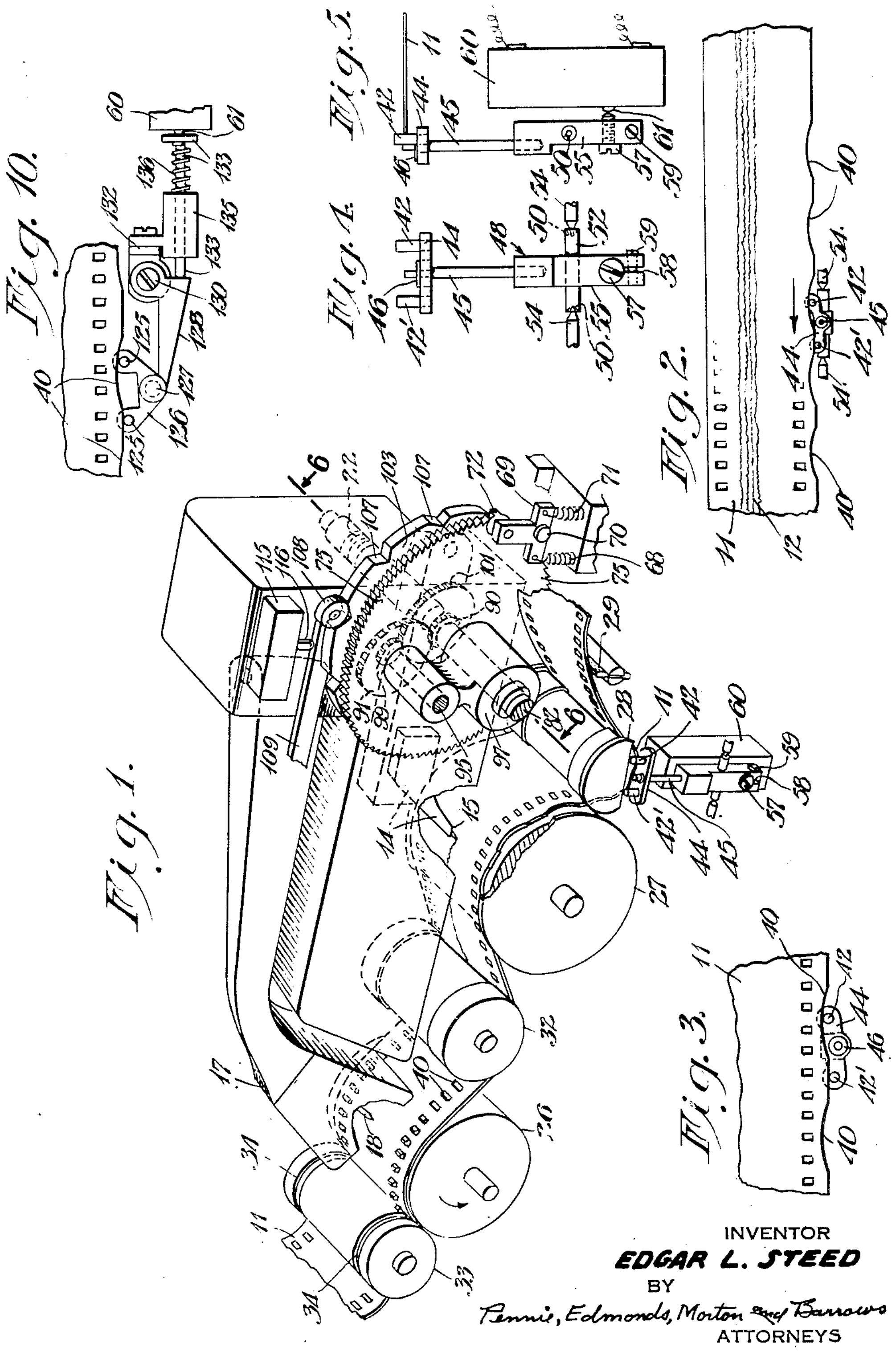
Fig. 1 is a perspective drawing showing portions of an apparatus for recording and reproducing sound employing a film strip as a record medium and including sound head indexing or track-shifting control means in accordance with the invention.
Fig. 2 is a plan view of a section of the record film showing the notches for initiating a track-shifting cycle and one form of mechanism actuated thereby, in accordance with the invention.
Fig. 3 is an enlarged detail of Fig. 2.
Fig. 4 is an enlarged side elevational view of the film-actuated mechanism of Fig. 1.
Fig. 5 is an enlarged end elevational view of the mechanism of Fig. 4, showing its relation to the film and to a switch.
Fig. 10 is a view showing a modified construction of the film-actuated mechanism.

Referring more particularly to Fig. 1 there is shown as an illustration of one form of apparatus embodying the invention, a sound recording and reproducing device employing as a record medium a strip of preforated motion picture film 11 without an emulsion coating, preferably of the cellulose acetate variety and having a thin coating of wax as a surface lubricant. Film 11 is adapted to have formed therein a sound record comprising a plurality of indented, longitudinal sound tracks 12, parallel to the edge of the film, best seen in Fig. 2.

In addition to a recording head 14, actuated by suitable sound means (not shown) and having a recording stylus 15, a reproducing head 17 having a stylus 18 is provided for playing-back the record, in cooperation with suitable amplifying means and a loud speaker (not shown). Both the recording and reproducing heads may be mounted on a common carriage 20 (Fig. 6) guided for displacement transversely of the film. For simplicity, in describing the indexing means and its operation, the indexing of the recording head, and stylus, to the several spaced sound track positions will be principally referred to herein, it being understood that a reproducing head may be similarly and, if desired, simultaneously displaced.

Figures 6, 7, 8, 9, 11, 12:
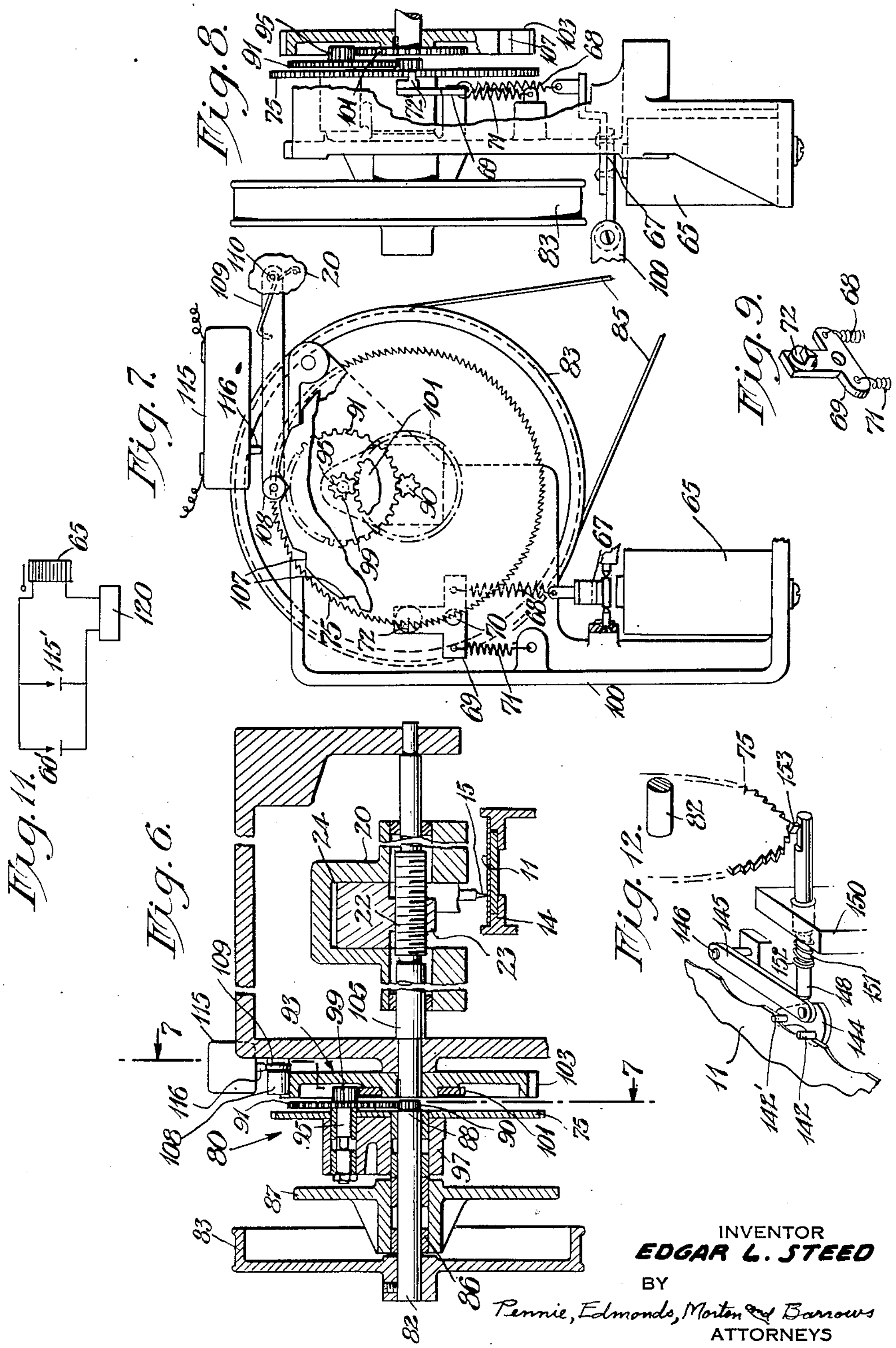
Fig. 6 is a sectional elevational view of a portion of the apparatus of Fig. 1, taken along the line 6—6 of that figure, showing mechanism for traversing the recording stylus across the film.
Fig. 7 is an elevational view taken as a section along the line 7—7 of Fig. 6.
Fig. 8 is a fractional end elevational view of the mechanism of Figs. 6 and 7, with portions thereof broken away, looking toward the left of Fig. 7.
Fig. 9 is an enlarged detail of a pawl shown in Figs. 6 and 7.
Fig. 11 is a circuit diagram showing electrical connections of the apparatus.
Fig. 12 is a perspective drawing of another modification of the film-actuated mechanism.

Carriage 20 mounting recording head 14 is traversed across film 11 by rotation of a lead screw 22 engaging a threaded nut 23 disposed within a notched portion 24 of the carriage, best seen in Fig. 6. Film strip 11, which may be standard 35 mm. film or of other width, is preferably arranged as an endless loop with or without a reverse twist, both driving arrangements being known and used in the art, and may be guided in any suitable manner. The usual perforations in the film are shown in Fig. 1 as engaged by the teeth of sprocket roller 26 adapted to be driven by motive means of any suitable type (not shown) to propel film 11 under stylus 15 at a selected speed suitable for recording purposes. Speeds of 20 to 60 feet per minute and higher have been successfully used with one type of apparatus incorporating the invention. Engagement of stylus 15 with film 11 occurs as the film passes over a flanged recording drum 27, after having passed over a film wiper 29 and a stationary guide post 28. Means, not illustrated, may be provided for controllably engaging the stylus with the film. From drum 27 the film passes beneath another stationary guide post 32 before being engaged by sprocket roller 26. A rotatable guard roller 33 having grooves 34 fitting over the teeth of the sprocket roller may be provided to prevent disengagement of the film and sprocket.

Upon the completion of one sound track, the recording stylus is indexed or shifted transversely of the film to the position of the next track by rotation of lead screw 22 and the displacement of nut 23 and carriage 20, under the control of means presently to be described, without lifting the stylus from the film, resulting in a plurality of sound tracks in the film parallel throughout the major portion of their length but connected by cross-over sections of limited extent to form a continuous groove. If a reverse twist is included in the endless film loop, both sides of the film may be utilized for recording purposes, otherwise the record is made on one surface only.

Film 11 has a series of uniformly spaced notches 40 in one edge thereof, shown in Figs. 2 and 3, by way of illustration, as having a rather shallow circular form. Adjacent notches are separated by flat, non-indented portions of the film edge preferably of lesser width than the notches. In continuous engagement with the edge of the film bearing notches 40, at a recessed end portion 41 of stationary guide post 28, is a pair of wear-resistant sapphire pins 42, 42'. The film at this point in its travel is held against lateral displacement by the flanges of drum 27 and post 28. Pins 42, 42' have their axes substantially perpendicular to the film and are mounted on a rocker arm 44 in spaced relation preferably approximating half the pitch or center-to-center spacing of the notches. The spacing of the pins, however, may vary within limits relative to the spacing of the notches, as will be explained hereinafter.

Arm 44 has its bearing on an end section of reduced diameter of a rod 45 and may be retained thereon by a collar 46. Rod 45 is part of an arm or lever assembly 48 pivoted about a stationary axis in a plane perpendicular to the axis of the rod. To this end pivot cups 50 are formed in the respective ends of transverse pin 52, forming part of the lever assembly, which are adapted to receive adjustable cone-pointed pivot screws 54, mounted on stationary means, the pivotal axes of pin 52 being offset slightly with respect to the axis of rod 45 and of the bearing of arm 44 thereon. The relation of the axes of the film-actuated means to the film and to one another is best seen in Figs. 4 and 5. Member 55 of lever assembly 48 mounting pivot pin 52 carries a screw 57 projecting beyond said member for normal engagement with a plunger 61 of a micro-switch 60, spring biased outwardly. Switch 60 is operated to a closed position at the outward limit of the working displacement of plunger 61.

With plunger 61 in abutting engagement with the end of screw 57 the spring bias of the plunger tends to cause rotation of lever assembly 48 about pivots 54 and thereby to urge sapphire pins 42, 42′ toward continuous engagement with the edge of the film bearing notches 40. Resilient means external to switch 60 may be employed for biasing purposes in combination with or in place of the switch bias. A slot 58 and clamping screw 59 provide means for securing screw 57 in an adjusted position. Switch 60 requires an outward displacement of plunger 61 of only a few thousandths of an inch from the unoperated position in which the plunger is normally held, to effect closure of its internally disposed contact 60′, represented in the circuit diagram of Fig. 11. Adjustment of screw 57 provides an adjustment of the range of displacement of plunger 61.

The effect of the passage of the film notches past pins 42, 42′ may now be traced. As the first notch to reach pin 42 passes this pin, the pin drops into the notch while its companion pin 42′ continues to ride on the non-indented edge of the film. Since the axis of rod 45 is equally spaced from the pin axes, the upper end of the rod is thereby displaced in a direction perpendicular to the film edge by an amount substantially equal to half the depth of the notch and the entire lever assembly 48 is rotated about pivots 54 through a corresponding angle. By suitable adjustment of the longitudinal position of screw 57 this rotation may be caused to displace switch plunger 61 an amount sufficient to operate switch 60 to a closed position while rotation through a substantially smaller angle is ineffective to operate the switch.

As pin 42 rises out of the first notch, companion pin 42′ enters the notch and when pin 42 rides on the flat portion of the film edge between the first and second notches pin 42′ is in the trough of the first notch. As pin 42′ rises out of the first notch pin 42 enters the second notch, and so on. The displacement of the upper end of rod 45, the pivot of the rocker arm 44 on which the pins are mounted, is substantially the mean of the instantaneous displacements of the pins and this mean displacement is nearly constant during passage of the film notches, or at least has a sustained unidirectional component which, when translated into rotation of lever assembly 48, may be caused to hold switch 60 closed, again with suitable adjustment of screw 57. At the same time the alternating character of the pin displacements causes arm 44 to oscillate about its bearing on rod 45.

The relation of the spacing of the pins to the width and spacing of the actuating notches will now be examined. To produce a displacement of the pivot point of arm 44 having a sustained unidirectional component and a corresponding rotational displacement of lever assembly 48 about its pivotal axis during the period of the passage of a plurality of the film notches, with uniformly formed and uniformly spaced notches, the pin spacing should be greater than the width of the flat between notches but less than the width of the notches, except that any distance within the range so defined a multiple of the center-to-center spacing of the notches may be added. This condition is based on the fact that the pins cannot be allowed to ride on a non-indented portion of the film edge simultaneously at any instant during the passage of the notches, if sustained unidirectional rotation of lever assembly 48 is to result.

While sustained displacement of the pivoted film-actuated means and sustained operation of switch 60 during passage of the film notches is a preferred method of operation of the invention, it to be expressly understood that it is not the only method, since with the time delay introduced by the operation of the indexing mechanism and due to the operation of an electrical holding circuit, to be referred to hereinafter, a momentary opening of switch 60 may occur during the passage of the notches without affecting the completion of the indexing cycle initiated by the closing of this switch. The primary effect of the closing of switch 60 is to cause the operation of electromagnet 65, Figs. 7 and 11, and thus to initate operation of the mechanism for traversing carriage 20, now to be described.

Armature 67 of magnet 65 is connected by extension spring 68 to one arm of a three-armed lever 69 pivoted at 70, the opposite arm of which is connected by a retracting spring 71 to the frame 100 of the machine. The third arm, perpendicular to the first two, carries a pawl 72, seen in detail in Fig. 9, adapted to engage teeth in the periphery of a ratchet wheel 75 forming a part of a planetary transmission through which lead screw 22 is operated. Spring 71 normally holds pawl 72 out of engagement with ratchet wheel 75. When magnet 65 is unoperated, spring 68 is in its free, closely coiled, condition and is adapted to serve substantially as a solid link between the magnet armature and the pawl rocker arm. Upon operation of the magnet and displacement of armature 67 thereof, should pawl 72 immediately enter into an indentation between successive teeth in the periphery of the ratchet wheel, spring 68 acts in its capacity as a solid link, or is stretched to only a very slight extent. Should, however, the pawl first happen to strike the apex of a tooth on the ratchet wheel, spring 68 is substantially extended and exerts a pressure on the pawl which later seats the pawl in an adjacent indentation. The resiliency of the spring permits the relay armature to complete its travel without chatter, which might otherwise occur, in the case where the pawl is not seated immediately. Since spring 68 is in its free condition or only slightly extended and exerts no counterforce when pawl 72 is in firm engagement with ratchet wheel 75, substantially the full force of retracting spring 71 is effective in releasing the pawl upon de-energization of magnet 65.

Planetary transmission 80 comprises a shaft 82 on which a pulley 83 is mounted for continuously rotating the shaft from suitable means, such as the film propelling means, for example, by way of belt drive 85. Shaft 82 is journaled in a bearing sleeve or sleeves 86 in stationary bracket 87 integral with the frame of the machine. At the end opposite pulley 83 a section 88 of shaft 82 of reduced diameter fixedly mounts a sun gear 90 meshing with gear 91 of a planet gear assembly 93. Assembly 93 is fixed on a stub shaft 95 rotating within a suitable bearing on planet gear arm 97 which, in turn, is rotatable about shaft 82.

A second gear or pinion 99 forming a part of planet gear assembly 93 is coaxially affixed to and rotates with gear 91. Gear 99 meshes with a gear 101 mounted on a hub of a cam wheel 103 which is itself fixedly mounted on shaft 105, coaxial with shaft 82. On an extension of shaft 105 is formed lead screw 22, previously referred to, which engages nut 23 for traversing carriage 20 bearing the recording and reproducing heads. The periphery of cam wheel 103 is formed with a plurality of regularly spaced triangular notches 107 which cooperate with a roller 108 of cam follower 109, pivoted at 110, to determine the indexing of carriage 20 transversely of the film. Displacement of cam follower 109 about pivot point 110 operates a second micro-switch 115, closed by inward displacement of the plunger 116 thereof. As seen in the circuit diagram of Fig. 11 the contacts 115' of switch 115 are connected in parallel with the contacts 60' of switch 60.

Shaft 105 and lead screw 22 introduce a considerable frictional load in the output of the planetary transmission, due to friction at nut 23, at the carriage guides and other places. Accordingly, shaft 105 normally remains stationary while gear 99 of the planet gear assembly rolls around the periphery of gear 101 under the influence of the rotation of shaft 82 and the drive for gear 90 to gear 91. However, when planet gear carrier arm 97 is immobilized by the engagement of pawl 72 with ratchet wheel 75, fixedly mounted on arm 97, this frictional force is overcome and the displacement of shaft 82 is transmitted to shaft 105 and lead screw 22 by way of meshing gears 90, 91 and 99, 101.

Planetary transmission 80 may, for convenience, be described as a mechanical network comprising three operative or transmission arms, two of which are independently displaceable while displacement of the third is related to the combined displacements of the other two, these displacements being combined algebraically. Thus by displacing what may be termed the input arm (shaft 82) at a continuous rate and controlling the displacement of a second arm (rotatable planet gear carrier arm 97), the displacement and rate of displacement of the third or output arm (shaft 105) may be controlled, in the present instance from zero upwardly in one direction.

The sequence of events in the indexing or track-over cycle will now be described.

Upon reaching the end of one of the parallel sound tracks, the passage of film notches 40 past pins 42, 42' causes a sustained angular displacement of lever assembly 48 about pivots 54 and the closing of micro-switch 60. As seen in Fig. 11 the closing of this switch energizes magnet 65 from source 120 and, due to the displacement of armature 67, causes pawl 72 to engage an indentation in the periphery of ratchet wheel 75, thus holding this wheel and planet gear arm 97 stationary. In this condition of the planetary transmission, motion is transmitted from shaft 82 to shaft 105 in the manner described above. As shaft 105 commences to rotate, roller 108 of cam follower 109, riding on the periphery of cam wheel 103, is raised out of whichever of the indexing notches 107 it has rested in during the making of the sound track just completed and thereby closes micro-switch 115, completing a connection by way of contacts 115' in parallel with contacts 60' of switch 60 constituting a holding connection insuring the continued energization of magnet 65 after switch 60 has opened due to the passage of the last of the film notches past pins 42, 42'.

So long as magnet 65 is energized and holds pawl 72 in engagement with ratchet wheel 75, lead screw 22 is turned and causes carriage 20 carrying the recording head and stylus (and the reproducing head) to be traversed across the film until roller 108 of cam follower 109 drops into the next indexing notch 107 in cam wheel 103. The dropping of roller 108 into this notch opens switch 115 and de-energizes relay 65, thereby stopping rotation of the lead screw and traverse of the carriage by again permitting free rotation of planet gear arm 97. At this time the recording stylus has completed the cross-over between adjacent sound tracks and is in the proper position to commence the making of a new track. The track-over cycle has thus been completed. The distance which carriage 20 is traversed while cam wheel 103 is advanced the angular distance between successive notches 107, is determined by this angular spacing and the pitch of lead screw 22.

In order to make the indexing control mechanism insensitive to the passage of sprocket hole tears and other defects of the film edge, it is desirable that there be a slight time delay between the closing of switch 60, which closing in the case of edge defects is only momentary, and the closing of switch 115, since with the closing of the latter switch the track-shifting cycle continues to completion. This delay may be secured by an adjustment of the relation of plunger 116 of switch 115 to its actuating member, cam follower arm 109, such that momentary energization of magnet 65 and stoppage of ratchet 75 does not cause roller 108 on arm 109 to lift far enough out of the notch in which it rests to result in the closure of switch 115. Alternatively or in combination with the above described delay means, the delay introduced by the time necessary for armature 67 of magnet 65 to complete its travel may be made use of and this time may be adjustable. Magnet 65, itself, may be a slow acting device, magnets having this characteristic being well known in the art. In this case armature 67 will only be attracted to the magnet core when the energization of the magnet persists for an appreciable time. Other well known expedients for securing a time delay also may be employed. The time delay introduced will vary with the type of irregularities which may be expected in the film edge, as found by experience. In general, it is desirable that this delay be greater than the transit time of one of the actuating notches past the pins.

As has been mentioned, carriage 20 mounts both recording and reproducing heads, which may be referred to jointly as sound heads. During the recording process the recording stylus 15 is in constant engagement with the film to form a continuous sound track consisting of parallel portions joined by short cross-over sections, while the reproducing stylus is out of contact with the film. When reproduction or playing-back of the recorded sound is desired, the position of the recording stylus and the reproducing stylus relative to the film is reversed, the reproducing stylus then following the sound track and, through the reproducing head, reproducing amplifier and loud speaker, providing an audible version of the recorded sound.

A modification of the means for actuating micro-switch 60 upon passage of the film notches is shown in Fig. 10. A pair of sapphire pins 125, 125′, corresponding to pins 42, 42′, bear against the suitably guided edge of the film carrying notches 40 and are mounted in spaced relation preferably approximating half the spacing of the notches, on a rocker arm 126 pivoted at 127 on a second arm 128 about an axis perpendicular to and spaced from the film edge. Arm 128, in turn, is pivoted at 130 on stationary means, such as bracket 132, about an axis parallel to that of pivot 127 and has a projection engaging the end of a switch-actuating pin 133. The pin is guided in a hole in guide bracket 135 mounted on bracket 132 and the head of the pin is adapted to engage operating plunger 61 of switch 60. For resiliently urging pins 125, 125′ against the film edge, a spring 136 is interposed between the under surface of the head of pin 133 and bracket 135.

The operation of the switch-actuating assembly of Fig. 10 is generally similar to that of the assembly shown in Figs. 1–5. Passage of notches 40 displaces pins 125, 125′ to rock arm 126 about pivot 127 and by a suitable choice of the relation of the form and spacing of the pins to the form and spacing of the notches a steady displacement of arm 128 about pivot 130 is simultaneously produced and persists during the transit of the notches. Switch pin 133 is thereby displaced outwardly under the influence of spring 136, which may be aided by the resilient bias of plunger 61, to operate the switch to a closed position. The distinctive feature of this modification is that the two axes about which the film engaging pins are oscillated are parallel instead of at an angle to one another.

In both the modifications of Fig. 1 and Fig. 10, the sapphire pins engage the notched edge of the film with their axes at a substantial angle to the film, preferably approaching the perpendicular, or if engagement occurs where the film is guided in a curved path, the pin axes are preferably in substantially perpendicular relationship to the tangent to the median section of the film between the pins, and the axis, intermediate the pins, of the rocker arm on which the pins are mounted is preferably parallel to the pin axes. The considerations governing the relation of the spacing of the pins to the width and spacing of the notches are the same with respect to both modifications.

A further modification of the film-actuated mechanism is shown in Fig. 12, wherein the magnet for operating the pawl engaging ratchet 75 is eliminated. In this figure pins 142, 142′, corresponding to pins 42, 42′, respectively, are mounted on rocker arm 144, pivoted on arm 145 which in turn is pivoted at 146 to stationary means. Arm 145 bears against the end of rod 148 slidably mounted for longitudinal displacement relative to stationary means 150. Rod 148 is urged against arm 145 by a spring 151 bearing against a collar 152 on the rod and against means 150. At its outer end rod 148 carries a pawl 153 which may be of triangular section and generally similar to pawl 72. In operation displacement of pins 142, 142′ by the passage of the notches in film 11 causes a sustained clockwise rotational displacement, as seen in the figure, of arm 145 about pivot 146, which permits the apex of pawl 153 to engage a serration in the periphery of ratchet disk 75 and immobilize this disk, thereby initiating the track-shifting cycle as described in connection with modifications previously referred to.

It will be apparent from the foregoing description of various embodiments of the invention that there has been disclosed selective control apparatus actuated by the passage of contour irregularities in a controlling member which may be employed in a variety of arrangements to control means adapted to perform a variety of functions, apparatus for the recording and reproduction of sound being described herein in this connection by way of illustration, only. Since many modifications not illustrated or specifically referred to herein are possible without departing from the spirit of the invention, it is to be understood that the invention is not limited in scope by the details of the present disclosure but only by the appended claims.

I claim:

1. In sound recording and reproducing apparatus a longitudinally movable record strip having a series of uniformly spaced notches in an edge thereof, cooperative means pivoted about two axes adapted for oscillation about one of said axes and for sustained unidirectional displacement about the other of said axes responsive to passage of said notches thereby and sound head indexing means actuated by sustained displacement of said pivoted means about said other axis, said indexing means including slow acting means requiring an actuating displacement of said pivoted means persisting for a period appreciably greater than the transit time of one of said notches past said pivoted means to initiate an indexing operation.

2. In sound recording and reproducing apparatus, a longitudinally movable record strip having a plurality of uniformly spaced relatively shallow notches of circular form and of uniform width in an edge thereof separated by flat sections of lesser width, an arm, a pair of cylindrical members of materially less extent longitudinally of the strip than the width of said notches mounted on said arm in parallel relation spaced at a distance greater than the width of said flat sections and less than the width of said notches, said members engaging said edge at a substantial angle to the strip, means pivoting said arm about two axes, said one axis being parallel the axes of said cylindrical members and intermediate the members, means resiliently biasing said members against said edge, the passage of said notches past said members oscillating said arm about said one axis and producing a displacement of said arm about said other axis having a sustained unidirectional component, and sound head indexing means actuated responsive to said last named displacement.

3. In indexing apparatus, control means producing a unidirectional displacement of a member or members about one axis coexistent with a substantially continuously oscillating displacement about another axis, comprising a continuously displaceable strip bearing a series of uniform notches in an edge thereof, said notches being symmetrical about a lateral axis of the strip and spaced by uniform flat sections of lesser width, a pair of cylindrical members of substantially less thickness than the width of said notches and composed of wear-resistant material adapted for simultaneous engagement with said edge, an arm mounting said members in parallel relation with the axes thereof at an angle approaching the perpendicular to said strip and mutually spaced a distance greater than the width of said flat edge sections but less than the width of said notches, a second arm or lever pivotally mounting said first arm about an axis intermediate said cylindrical members and parallel the axes thereof, said second arm being pivoted to stationary means about an axis displaced from the pivotal axis of said first arm, resilient means engaging said second arm to urge said cylindrical members against said strip edge, the passage of said notches producing a displacement of the pivotal axis of said first arm having a unidirectional component and a corresponding rotation of said second arm coexistent with oscillation of said first arm about the pivotal axis thereof, and indexing means actuated responsive to said unidirectional displacement.

4. In sound recording and reproducing apparatus a longitudinally movable record strip having a series of uniformly spaced indentations of uniform width in an edge thereof separated by non-indented sections, means mounted for rotation relative to said strip about two axes including a pair of pins respectively on opposite sides of one of said axes and adapted for simultaneous longitudinally spaced engagement with said edge, means biasing said pins toward said edge, the spacing of said pins being so related to the spacing and width of said indentations that passage of a plurality of the indentations past the pins results in a sustained change in the instantaneous mean position of the two pins and a corresponding displacement of said rotatable means about said other axis, and sound head indexing control means actuated responsive to rotation of said rotatable means about said other axis.

5. In sound recording and reproducing apparatus a longitudinally movable record strip having a series of uniformly spaced indentations of uniform width in an edge thereof separated by non-indented sections, means mounted for rotation relative to said strip about two axes including a pair of pins respectively on opposite sides of one of said axes and adapted for simultaneous longitudinally spaced engagement with said edge, means biasing said pins toward said edge, the spacing of said pins being so related to the spacing and width of said indentations that passage of a plurality of the indentations past the pins results in a sustained change in the instantaneous mean position of the two pins and a corresponding displacement of said rotatable means about said other axis, and sound head indexing control means actuated responsive to rotation of said rotatable means about said other axis including means delaying operation of said control means for a period at least equal to the transit time of one indentation past said pins.

6. In apparatus for indexing a sound head relative to a longitudinally movable record strip to a plurality of laterally spaced sound track positions, said strip bearing a series of uniform notches uniformly spaced in an edge thereof by flat sections of lesser width, a pair of wear-resistant film contacting members, a first arm mounting said members in spaced relation at a distance included in the range defined as greater than the width of said flat sections but less than the notch width, plus any multiple of the center-to-center spacing of the notches including zero, a second arm pivoting said first arm about an axis intermediate said members, means pivoting said second arm to stationary means, resilient means engaging said second arm for urging said members against said edge, and contact means controlling an indexing mechanism actuated by sustained unidirectional displacement of said second arm only about the pivotal axis thereof.

7. In sound recording and reproducing apparatus a record strip having a series of uniform notches uniformly spaced in an edge thereof, control means comprising a first arm pivoted to stationary means, a second arm pivoted on said first arm for oscillation about an axis parallel the pivoted axes thereof, a pair of spaced parallel pins mounted on said second arm on opposite sides of the pivotal axis thereof, means biasing said pins toward engagement with said edge, said two pivotal axes being at an angle to said strip approaching the perpendicular to the median section between said pins, and contact means actuated by rotation of said second arm about the pivotal axis thereof.

8. In a sound recording and reproducing apparatus a carriage mounting a stylus, a record strip in the form of an endless loop cooperative with said stylus having a series of uniform notches uniformly spaced at a selected location in an edge thereof, said notches being separated by flat sections of lesser width, means for longitudinally moving said strip relative to said stylus and means for successively indexing said carriage transversely of said strip once for each revolution of said loop to a plurality of positions in which said stylus is in registry with successive sound track positions, comprising carriage traversing means, a pair of members adapted and biased simultaneously to engage the notched edge of said strip, means mounting said members in spaced relation greater than the width of said flat sections but less than the width of the notches for oscillation about two axes, respectively, one of said axes being substantially parallel the edge of the median portion of said strip between said members and spaced from said strip and the other of said axes being intermediate said members and substantially perpendicular to said median portion of the strip, and means initiating operation of said carriage traversing means responsive to rotation of said members about said parallel axis only.

9. In sound recording and reproducing apparatus means for actuating a sound head indexing mechanism subjected to substantial friction comprising a planetary gear transmission having three transmission arms, two of said arms being independently displaceable and displacement of said third arm being jointly dependent upon displacement of the other two, one of said arms being connected to drive said mechanism and being normally held stationary due to the friction therein, motive means for continuously displacing another of said arms, said third arm normally experiencing continuous displacement, and means for arresting the normal motion of said third arm including electromagnetically actuated means adapted to engage and immobilize said third arm, and a movable record medium in the form of a continuous loop carrying means for actuating said electromagnetic means at a selected phase of the motion of said medium.

10. In sound recording and reproducing apparatus means for actuating a sound head indexing mechanism subjected to substantial friction comprising a planetary gear transmission having three transmission arms, two of said arms being independently displaceable and displacement of said third arm being jointly dependent upon displacement of the other two, one of said arms being connected to drive said mechanism and being normally held stationary due to the friction therein, motive means for continuously displacing another of said arms and means for arresting the normal motion of said third arm including electromagnetically actuated means having a time delay action adapted to engage and immobilize said third arm, contact means for energizing said last means, a record medium in the form of a longitudinally movable continuous loop carrying control means for actuating said contact means at a selected phase of the motion thereof and means actuated by displacement of said first arm for limiting said displacement.

11. In sound recording and reproducing apparatus employing a longitudinally driven endless record strip adapted to carry a plurality of spaced sound tracks extending longitudinally of the strip and having a series of spaced notches in an edge thereof, a stylus, stylus indexing means comprising a carriage mounted for displacement transversely of said strip, a lead screw in threaded engagement with said carriage, driving means for said lead screw including a planetary gear transmission having three transmission arms, one of said arms being connected to drive said lead screw, motive means for effecting continuous displacement of another of said arms and a pawl and ratchet mechanism for selectively controlling displacement of the third of said arms and means for actuating said pawl to stop displacement of said third arm and initiate a displacement of said carriage responsive to passage of said notches.

12. In control apparatus the combination of a strip member adapted to be moved longitudinally and having uniformly spaced irregularities in an edge thereof, a rocker arm, means pivoting said arm, a pair of means mounted on said arm adapted, respectively, simultaneously to engage said strip edge at spaced locations therealong and to be displaced upon passage of said irregularities, said displacement including an oscillation about the pivotal axis of said arm and a unidirectional displacement transversely of said strip, and means controlled by said unidirectional displacement of said pivoting means.

13. In control apparatus the combination of a strip member adapted to be moved longitudinally and having uniformly spaced uniform contour irregularities in an edge thereof, means for moving said member longitudinally thereof, a rocker arm, a displaceable member pivoting said arm about an axis normal to said strip, a pair of pins mounted on said arm on opposite sides of the pivotal axis thereof, resilient means adapted to apply a force to said pivoting member to bias said pins toward simultaneous engagement with said strip edge, said arm being adapted to be oscillated about the pivotal axis thereof upon passage of said edge irregularities past said pins and to effect a unidirectional displacement of said pivoting member simultaneously therewith, and means controlled by said displacement of said pivoting member.

14. In control apparatus the combination of a strip member adapted to be moved longitudinally and having a series of uniform notches uniformly spaced in an edge thereof with flat edge sections of lesser width between adjacent notches, means for moving said member longitudinally thereof, a rocker arm, a member pivoting said arm about an axis normal to said strip and displaceable transversely of the strip, a pair of pins mounted on said arm on opposite sides of the pivotal axis thereof, said pins being spaced a distance less than the width of said notches but greater than the width of said flats, and resilient means adapted to apply a force to said pivoting member to bias said pins toward simultaneous engagement with said notched strip edge, whereby upon passage of said notches past said pins said arm receives a displacement having an oscillatory component and a unidirectional component transversely of said strip.

15. In control apparatus the combination of a strip member adapted to be moved longitudinally and having a plurality of uniform notches uniformly spaced in an edge thereof separated by flat edge sections of lesser width than the notches, a pair of members biased toward simultaneous resilient engagement with said notched edge and mounted for joint oscillation about an axis intermediate the individual members thereof, said pair of members being spaced apart a distance less than the width of said notches but greater than the width of said flats, means operatively connected to said pair of members to receive a displacement determined by the combined instantaneous displacements of the individual members thereof, passage of said notches simultaneously oscillating said pair of members and displacing said means.

16. In control apparatus the combination of a strip member adapted to be moved longitudinally and having uniformly spaced contour irregularities in an edge thereof, means for moving said member longitudinally thereof, a rocker arm, a member pivoting said arm about an axis normal to said strip and displaceable transversely of the strip, a pair of pins mounted on said arm on opposite sides of the pivotal axis thereof, resilient means adapted to apply a force to said pivoting member to bias said pins toward simultaneous engagement with said strip edge, said pins being thereby adapted to be displaced transversely of the strip upon passage of said contour irregularities, said irregularities being so formed and arranged relative to the form and arrangement of said pins as to cause said displacement of each pin to have an oscillatory component about said pivotal axis and a sustained unidirectional component transverse of said strip.

EDGAR L. STEED.

REFERENCES CITED

The following references are of record in the file of this patent:

UNITED STATES PATENTS

| Number | Name | Date |
|---|---|---|
| 1,056,794 | Howell | Mar. 25, 1913 |
| 1,474,409 | Depue | Nov. 20, 1923 |
| 1,821,775 | Tittle | Sept. 1, 1931 |
| 1,826,786 | Hopkins | Oct. 13, 1931 |
| 2,011,272 | Duggan | Aug. 13, 1935 |
| 2,066,041 | Kiel | Dec. 29, 1936 |
| 2,232,486 | Smith | Feb. 18, 1941 |
| 2,289,555 | Simons | July 14, 1942 |

FOREIGN PATENTS

| Number | Country | Date |
|---|---|---|
| 505,435 | Great Britain | May 8, 1939 |